United States Patent
Arney et al.

[11] Patent Number: 6,101,291
[45] Date of Patent: Aug. 8, 2000

[54] PLATEN-BASED IMAGE-AQUISITION APPARATUS HAVING PREVIEW FEATURE

[75] Inventors: Susanne Arney, Highland Park, N.J.; Rafael N. Kleiman, New York, N.Y.; Jacqueline J. Moskowitz, Short Hills, N.J.

[73] Assignee: Lucent Technologies Inc., Murray Hill, N.J.

[21] Appl. No.: 09/022,327

[22] Filed: Feb. 11, 1998

[51] Int. Cl.$^7$ .................................................. G06K 9/32
[52] U.S. Cl. ........................... 382/293; 382/312; 358/488
[58] Field of Search .................................. 382/293, 312, 382/282, 296, 298; 358/474, 488; 707/527, 526

[56] References Cited

U.S. PATENT DOCUMENTS

| | | | |
|---|---|---|---|
| 5,270,839 | 12/1993 | Parulski et al. | 358/474 |
| 5,309,558 | 5/1994 | Rourke et al. | 345/515 |
| 5,450,541 | 9/1995 | Rourke et al. | 707/512 |

*Primary Examiner*—Yon J. Couso
*Attorney, Agent, or Firm*—Mathews, Collins, Shepherd & Gould, P.A.

[57] ABSTRACT

An improved platen-based image acquisition apparatus has a preview feature which enables the user to view anticipated output from the apparatus so adjustments may be made before operating the apparatus in orienting a workpiece upon the platen or in selecting image control features. The preview feature comprises a display screen visible to the user and an image-processing system coupled to the preview display screen. The image-processing system images a region of the platen to define the platen-image and forms the platen-image upon the display screen. It may simultaneously form upon the screen a frame-image for indicating the portion of the platen bounding the image to be processed so a user can determine whether a workpiece is positioned in a desired orientation before operating the apparatus. The improved image-acquisition apparatus may comprise a photocopy machine, a scanner, or a facsimile machine, and preferably the platen-image is formed in real-time characteristics.

14 Claims, 7 Drawing Sheets

PLATEN-BASED IMAGE-AQUISITION APPARATUS HAVING PREVIEW FEATURE

FIELD OF THE INVENTION

The present invention relates to an improved platen-based image-acquisition apparatus having a preview feature. The preview feature enables the user to view anticipated output from the apparatus before the apparatus is activated so adjustments may be made in orienting a workpiece upon the platen or in selecting image control features.

BACKGROUND OF THE INVENTION

There are few businesses today that do not rely upon platen-based image acquisition apparatuses, such as photocopy machines, scanners, and facsimile machines. These devices may now even be frequently found in the home. A difficulty encountered in using these devices, however, is that the output does not always conform to the user's expectations with regard to orientation, dimensions, brightness, tone, magnification, or the like. Consequently, a user may have to activate the apparatus many times before the desired output is obtained, wasting time and resources.

As an illustration, a photocopy machine typically has at least two orientations (horizontal or vertical), for placing a workpiece upon a transparent platen, with the proper placement depending on which paper tray is selected. It is not uncommon for a user to place a workpiece upon the platen in the wrong position relative to the paper tray selected so the output is fragmented and misaligned; for example, a workpiece may be positioned vertically with the paper tray selected for a horizontally-positioned workpiece. Another commonly encountered frustration involves the user placing the workpiece on the platen in a crooked position so the copied image is tilted and edges of the workpiece get cut-off. These misalignment problems, or similar problems relating to selecting control features (e.g., magnification, brightness, etc.), are often encountered when the user wishes to create a copy having a graphic image different from that on the original workpiece (e.g., the copy is reduced in size or magnified or its orientation changed). In any case, these problems persist because with present-day copying machines, one cannot accurately anticipate the output such that numerous copies may have to be made before the right selection of controls is obtained.

Similar time-consuming frustrations are encountered with use of scanning devices. Due to slow scan acquisition times in current scanners, at the quickest rates available under today's standards a low resolution scan may consume from one to two minutes. A low resolution scan may be taken and shown on a computer screen with scanner-controlling software. In this way, a user may determine whether a workpiece is appropriately positioned on the platen of the scanner, and if necessary, reposition and reorient the workpiece. However, several low-resolution scans (each taking from one to two minutes), may be needed to position one workpiece, since the scanned image can be sensitive to slight misalignment of the workpiece relative to a cartesian coordinate image-input system. Also, the scan does not produce a high resolution image showing the fiduicials of the scanner platen.

The instant invention addresses these drawbacks. The invention provides an improved image-acquisition apparatus having a preview feature that may employ real-time imaging characteristics, and it enables the user to view anticipated output, e.g., sizing and positional attributes of the acquired image, so adjustments may be made before the apparatus is activated. The pre-view feature provides an environmental benefit in reducing waste of paper, toner, and other resources, and it saves time and increases efficiency, not only during the image-aquisition process but also during maintenance. Further advantages may appear more fully upon considering the description below.

SUMMARY OF THE INVENTION

Summarily described, the invention embraces an improved image-acquisition apparatus of the type having a transparent platen with an inner surface and outer surface, where a workpiece having graphic matter is positioned on the outer surface of the platen and an image-acquisition device disposed adjacent the inner surface of the platen transfers an image of the graphic matter to another medium. The inventive improvement comprises a preview display feature comprising a preview display screen visible to the user and an image-processing system disposed proximal the inner surface of the platen coupled to the preview display screen. The image-processing system images a region of the platen defining a platen-image and forms the platen-image upon the display screen. The image-processing system may also form upon the display screen a frame-image for indicating the portion of the platen bounding the image to be transferred so a user may determine whether a workpiece is placed in a desired orientation before operating the apparatus. The improved image-acquisition apparatus may comprise a photocopy machine, a scanner, or a facsimile machine, and preferably the platen-image is formed in real-time characteristics.

BRIEF DESCRIPTION OF THE DRAWINGS

For a better understanding of the invention, an exemplary embodiment is described below, considered together with the accompanying drawings, in which:

FIGS. 2A–2I illustrate various plan views of exemplary pictures that may be displayed by the preview display screen of the invention when a workpiece is positioned upon the platen of the improved acquisition apparatus, wherein:

FIG. 2G(1) reflects a workpiece properly oriented on the platen where a high-contrast image option is selected;

FIG. 2G(2) reflects a workpiece properly oriented on the platen where a low-contrast image option is selected;

It is to be understood that these drawings are for the purposes of illustrating the concepts of the invention and are not to scale.

DETAILED DESCRIPTION OF THE INVENTION

Figure 1A:
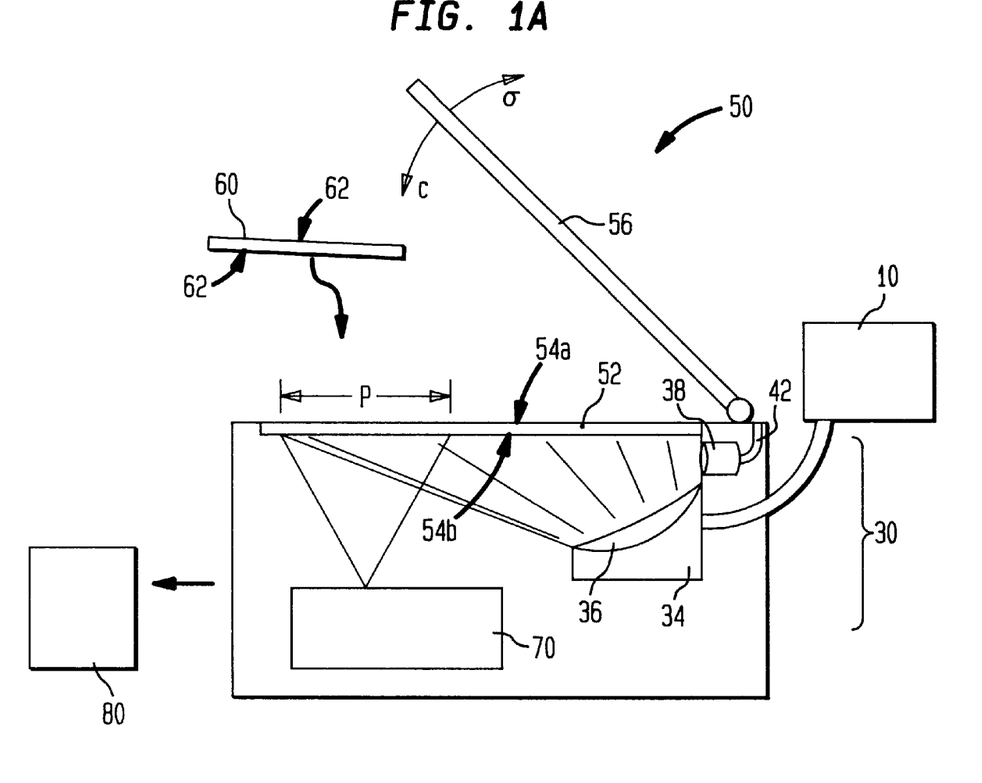
FIGS. 1A and 1B show a schematic cross-sectional and top plan view, respectively, of the improved platen-based image-acquisition apparatus.
Figure 1B:
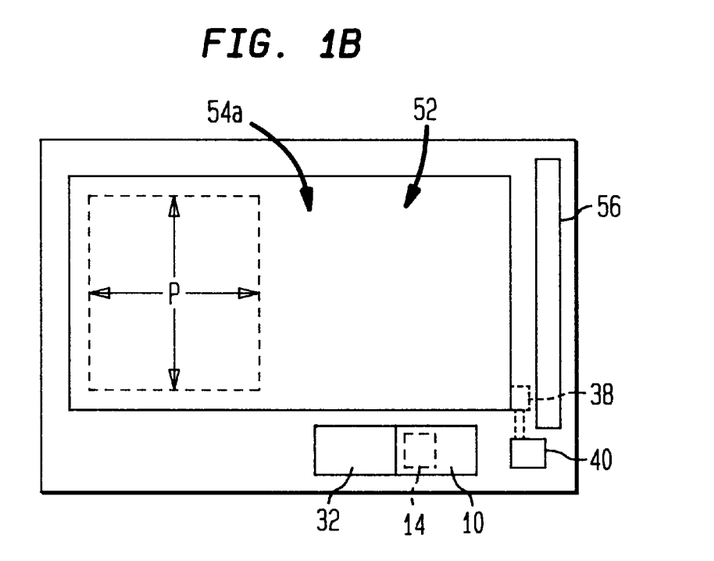

With reference to the figures, FIGS. 1A and 1B show a schematic view of the improved image-acquisition apparatus, with FIG. 1A showing a schematic cross-sectional view of the apparatus and FIG. 1B showing a schematic top plan view. The improved apparatus 50 has a preview display feature comprising a preview display screen 10, and an image-processing system 30 (FIG. 1A). The apparatus has a transparent platen 52 having an outer surface 54a and inner surface 54b. The outer surface 54a of the platen will receive and support a workpiece 60 having graphic matter 62 thereon to be reproduced or transferred onto another article or medium 80.

The workpiece may comprise a single-pieced item, a multiple-paged document, a two or three-dimensional object comprised of paper or matter other than paper, or any item capable of being received by the platen having graphic matter sought to be transferred. The graphic matter 62 appearing on the workpiece may comprise written or pictorial representations or variations in shading, tone, or color. Advantageously, a platen cover 56 is pivotally mounted on the apparatus 50 for moving from an open position to a closed position (following arrows o and c, respectively), which, when closed, blocks ambient light from the platen during use and prevents possible light saturation of the toner when the apparatus is not in use.

Proximal the inner surface 54b of the platen (distal the outer surface 54a), there is disposed a device 70 for transferring, processing, or reproducing an image to another medium 80 so that it may be output from the apparatus to the user. The device and medium are shown schematically at boxed regions 70 and 80, respectively (FIG. 1A). The device 70 may comprise, for example, a copying system of a photocopy machine, or the software, firmware, or hardware of a scanner through which the graphic matter is captured, bit-mapped, stored, or manipulated to be transferred to a monitor, memory, components, wiring, or printed page(s). Imaging systems and components of photocopying machines, scanners, and facsimile machines are known in the field and described in the following U.S. patents, all of which are incorporated herein by reference: U.S. Pat. No. 3,914,049 titled "Optical Scanning System" issued Oct. 21, 1975 to Basu et al.; U.S. Pat. No. 3,926,518 titled "Optical Scanning System" issued December 1975 to Berry et al.; U.S. Pat. No. 4,035,073, titled "Duplex Reproduction Machine" issued Jul. 12, 1977 to Del Vecchio; U.S. Pat. No. 4,120,579 titled "Imaging System for a Photocopying Device" issued Oct. 17, 1978 to Maiorano; U.S. Pat. No. 4,460,270 titled "Automatic Exposure Control for a Photocopying Machine" issued Jul. 17, 1984 to Watai et al.; U.S. Pat. No. 4,533,234 titled "Automatic Density Control Method for a Photocopying Machine" issued Aug. 6, 1985 to Watai et al.; U.S. Pat. No. 4,812,021 titled "Wide Angle Zoom Lens" issued Mar. 14, 1989 to Harrigan; U.S. Pat. No. 3,957,370 titled "Copying Device With a System for a Reflex Exposure of the Original" issued May 1975 to Vola; U.S. Pat. No. 5,642,197 titled "System and Method for Enhancing Color Separation Utilizing Multiple Pass Scanner in a Single Pass Color Scanner" issued Jun. 24, 1997, to Tuhro et al; U.S. Pat. No. 5,629,990 titled "Image-Processing System," issued May 13, 1997 to Tsuji et al.; U.S. Pat. No. 4,583,126 titled "Raster Input/Output Scanner" issued April 1986 to Stoffel; U.S. Pat. No. 5,187,588 titled "Scanner with Floating Backstop" issued February 1993 to Stemmle; and U.S. Pat. No. 5,515,451 titled "Image-Processing System for Selectively Reproducing Documents" issued May 7, 1996 to Tsuji et al.; U.S. Pat. No. 4,603,945 titled "Liquid Crystal Graphics Imager and Method" issued Aug. 5, 1986 to Fergason; U.S. Pat. No. 5,193,012 titled "Real-time Conversion of Still-video to Half-tone for Hard Copy Output" issued Mar. 9, 1993 to Schmidt; U.S. Pat. No. 5,157,516 titled "Method of Incorporating a Scanned Image Into a Page Layout" issued Oct. 20, 1992 to Bachar; and U.S. Pat. No. 5,111,308 titled "Method of Incorporating a Scanned Image Into a Page Layout" issued May 5, 1992 to Bachar. Accordingly, the medium 80 may comprise printed pages, monitors, memory, components, wiring, circuitry, hardware, firmware, or software of the image-acquisition apparatus. Typically, the image-acquisition device 70 will also comprise movable imaging optics.

The image transferred or reproduced to the medium 80 (the "transferred image"), is that which is displayed through the platen at the area designated on FIGS. 1A and 1B by arrows P. This area of the platen P, defining the boundaries of the transferred image, will be identified herein as the platen-select area or area P. The platen-select area P generally will be smaller or otherwise different in dimension than the entire platen region. Also, a control panel 32 (FIG. 1B), may be provided for adjusting the transferred image relative to the image of the graphic matter displayed through the platen, such as, for example, by magnifying or demagnifying the image, reducing the edges, or changing the brightness or contrast. Changing the control features may alter or impact upon the boundaries of platen-select area P, and this may create difficulties in properly orienting the workpiece on the platen for obtaining a desired transferred image to the medium 80.

A preview display screen 10 is provided visible to the user so the user can determine whether the workpiece is positioned in the desired orientation prior to operating the apparatus. The preview display screen 10 can be adjacent to or part of the control panel 32 on the surface of the apparatus (as in FIG. 1B), or it can comprise a separate component (as in FIG. 1A), or otherwise be disposed in the vicinity of the apparatus. The important consideration regarding placement of the display screen is that it be visible to the user and conveniently located adjacent the apparatus so a user can view it while positioning a workpiece upon the platen. Also, the preview display screen 10 should be visible to the user when the platen cover 56 is closed so the user can see if the workpiece shifts upon closing the cover 56, which sometimes happens.

An image-processing system 30 is coupled to the preview display screen and disposed proximal the inner surface of the platen 54b. The image-processing system 30 may comprise a camera 34 having one or more lenses 36 and lightsource 38. Applying imaging techniques known in the field, the system 30 images a predetermined region of the platen to define a platen-image, and the platen-image is formed on the preview display screen. The platen-image encompasses the platen-select area P and preferably corresponds to the entire platen region, as schematically illustrated in FIGS. 1A and 1B. This imaging of the entire platen may be accomplished with use of a properly selected and oriented lens 36 (FIG. 1A). Also, besides the camera and lightsource hardware, the image-processing system may comprise such other hardware and appropriate software or firmware for imaging the platen and manipulating or processing the platen-image to the preview display screen. Typically, this is accomplished by transferring the platen-image to computer memory or circuitry as electrical signals or light to be output via light images at the preview display screen.

In some platen-based image acquisition apparatuses, the platen-select area will correspond to the entire platen region, for example, when there are few options available to the user for image manipulation. In those cases, the preview feature may be advantageous for anticipating output related to the selection of control features, for example, brightness, contrast, or focus control. However, generally the platen-select area will comprise a region substantially smaller in size than the entire platen region. Thus, to aid in orienting the workpiece upon the platen, the image-processing system 30 may further comprise a means for forming upon the preview display screen a frame-image 14 (FIG. 1B See also FIGS. 2A–2I). The frame-image 14 indicates the area of the platen bounding the image to be transferred, that is, it delineates area P.

The image-processing system 30 is preferably coupled to the control panel 32 and responsive to the control settings so that the platen-image including the boundaries of the frame-image 14 will adjust with changes in control panel settings. In this way, a user may see, for example, how progressively changing the magnification will affect the area P of the platen (and thus of the workpiece) which is imaged; how the graphic matter of the workpiece will be reproduced when a new paper tray or paper size is selected; how much of the edge of a workpiece will be lost when the edge removal option is chosen; how changes in brightness or contrast might wash out or darken the image of either a color or multi-tone workpiece; whether, if a three-dimensional workpiece is pressed against the platen (e.g., a book), it is flattened sufficiently to prevent the text near the binding or edges from being out of focus; or whether a book workpiece is properly centered for two-page copying. When an option is selected, the camera may be adjusted to have the same depth of focus as the image-acquisition device 70. Also, the image-processing system may be coupled to the automatic paper-tray select option, if such option is available on the apparatus, so that when a particular paper tray is selected, a corresponding frame image is shown on the display screen. The control panel 32 may also include an option for activating the inventive preview feature itself.

Advantageously, the image-processing system 30 forms the platen-image on the display screen 10 in real-time characteristics. Alternatively, a rapid acquisition-and-read-out time screen may be used and may be coupled to a reset toggle for automatic clearing or resetting of the screen 10. In this case, a "snapshot" image of the platen is taken by the camera 34 and then transferred to the preview display screen 10. This may be accomplished with a video-rate camera using "frame-grabber" software or other techniques that are well-known to those skilled in the art. In a scanner application, the software for frame-grabbing may be bundled with the scanner-control software. The captured image remains in the preview screen for a short prescribed period of time or until the reset-toggle button is reactivated. The reset-toggle function allows a user to either capture and transfer a new image to the preview screen ("toggle") or clear the preview screen ("reset"), the latter ensuring privacy relative to the next operator. Hardware (timing motors or circuitry) or software means may be used to automatically reset or clear the preview display screen after a prescribed time or upon activation of the image-acquisition function.

An additional screen-image function may be included in the apparatus, using techniques which are well-known to those skilled in the art, so that the user may predict the effect of changes in contrast or brightness-type settings on the control panel by electronically altering the image on the screen. Although the actual output may depend upon toner level in the apparatus, the screen-image function nevertheless can instruct the user as to the approximate range of possibilities, from the image being washed-out to having a stark black-and-white contrast. Hardware, firmware, or software methods may be used to show the range of brightness, contrast, or resolution of a given image-acquisition device 70. Also, the lightsource 38 may be provided with a variable intensity and coupled to the control panel so that selecting a brightness or contrast control modifies the intensity of the lightsource, i.e., a choice of high brightness or contrast increases the lightsource intensity, while a choice of low brightness or contrast decreases the intensity.

The camera 34 and lens 36 may be movable relative to the platen 52. This is advantageously accomplished by fixing the camera 34, lens 36 and/or the lightsource 38 to the image-acquisition device 70 of the apparatus, or by merging them (e.g., the image processing hardware), with the optics of the image-acquisition device 70 which often move for magnification and demagnification functions. The camera is preferably a two-dimensional parallel image-input device. However, it also may be a line-camera with scanner capability for serially imaging the entire platen area and feeding the composite image to the preview screen. Many photocopiers and scanners employ one-dimensional serial image acquisition or image-acquisition devices, and therefore, if the optics of the image-processing system are merged with those of the image-acquisition device, it may be advantageous to use a one-dimensional serial image device for the image-processing system 30 as well. The camera 34, lens 36, and/or lightsource 38 also may be fixed relative to the platen, with the camera and lens movable relative to the image-acquisition device 70, although this is less preferred. Further, the camera 34 and the preview display screen 10 may generate the platen-image with black/white, color, or multi-gray-tone imaging and video-rate or still image output.

Preferably, for both the real-time and rapid acquisition-and-read-out time preview features, the lightsource 38 is normally in an "off" position (disabled) when the apparatus is idle to prevent possible light oversaturation of the toner similar to that which may occur in some photocopier models when the platen cover 56 is left open. Activation and deactivation of the lightsource can be performed manually by the user touching a switch, button, or software device 40 (FIG. 1B). Alternatively, the lightsource 38 may be automatically activated by a sensor or mechanical switch that is enabled when a user approaches the apparatus. For example, the lightsource may be coupled to the platen via circuitry 42 (FIG. 1A) so that the light is automatically activated when the user lifts the platen cover 56 to place the workpiece on the platen. When the user is satisfied the workpiece is properly positioned, the lightsource should be deactivated to avoid possible interference during the image-transfer process. Disabling of the lightsource may be actively or passively performed, e.g., the lightsource 38 may be coupled to the "start" button such that pressing this button both activates the image-acquisition device 70 and automatically deactivates the lightsource 38. The hardware, firmware, or software for the activation and deactivation of the lightsource may be merged with that for the light intensity modulation for illustrating brightness or contrast on the preview display screen.

FIGS. 2A–2I show exemplary images that may be formed on the preview display screen 10, although it is to be understood that a multitude of images may be formed. Such images may guide the user in properly placing the workpiece or selecting control features so that the output from the image-acquisition apparatus conforms to the user's expectations. Also, the inventive preview display feature may assist in maintenance of the apparatus, e.g., to check alignment of the optics of the image-acquisition device relative to a specification.

Referring to the figures, the image-processing system preferably images the entire platen 52 (FIGS. 1A–1B), so that the outer circumference of the screen 10 defined by edges 10*a*, 10*b*, 10*c*, and 10*d* (FIG. 2A), is illustrative of the edges of the platen 52. The workpiece 60 is shown with diagonal line-shading having both written 62*a* and pictorial 62*b* representations thereon, as well as variations in shading, tone, or color 62*c* to be transferred to the medium. The frame-image 14 is shown with hatched lines. For purposes of illustration, FIGS. 2A–2I will be described wherein the apparatus comprises a photocopy machine and the medium comprises an article such as paper or a transparency, although it is to be understood that the same concepts may apply to use of scanners or facsimiles.

Figure 2A:
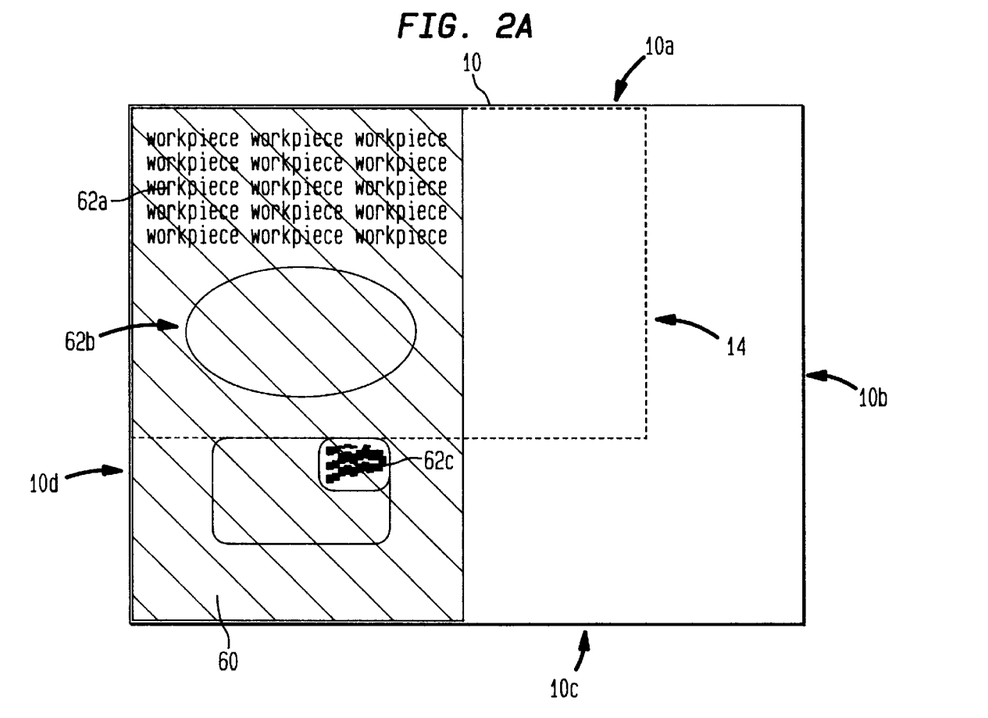
FIG. 2A reflects a workpiece vertically-positioned on the platen when the paper tray is selected for a horizontally-positioned workpiece.
Figure 2B:
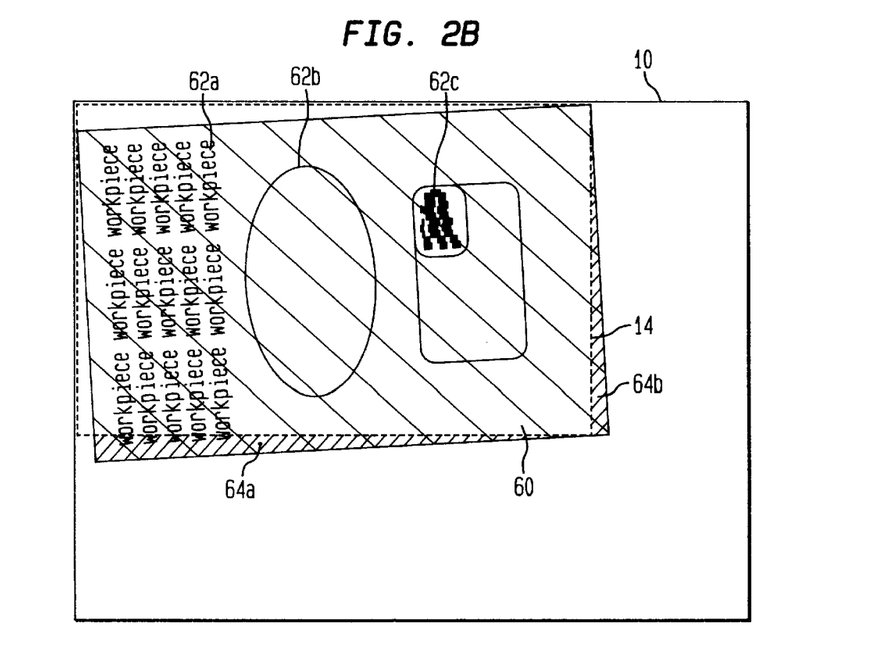
FIG. 2B reflects a workpiece placed on the platen in a crooked position.
Figure 2C:
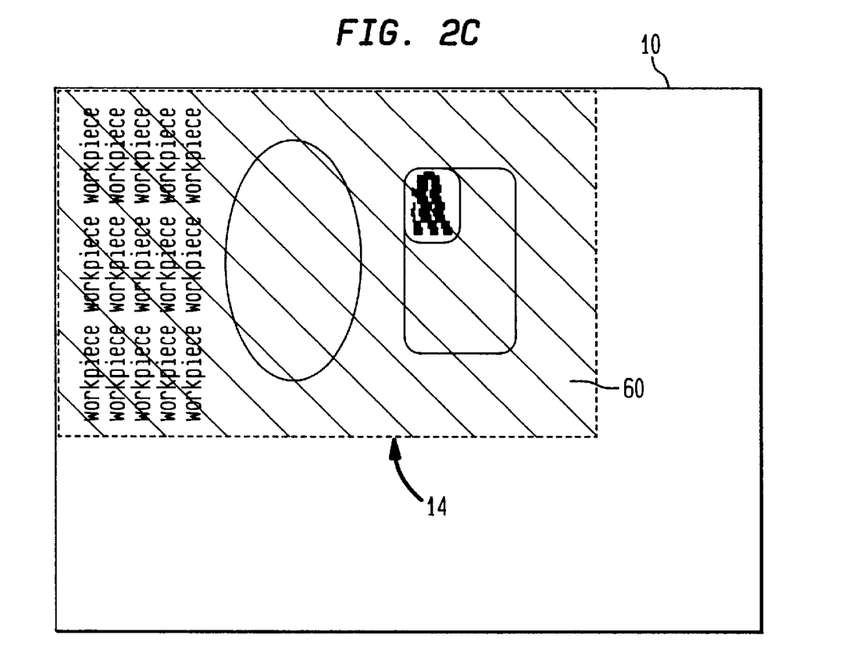
FIG. 2C reflects a workpiece properly oriented on the platen.

In FIG. 2A, the preview display screen 10 instructs the user that the workpiece is not properly oriented, that is, the workpiece 60 is positioned vertically relative to the bottom of the platen (e.g., 10*c*), and the frame-image 14 instructs that the paper should be horizontally positioned, i.e., the paper tray is selected for a horizontally-positioned workpiece. In FIG. 2B, the user has moved the workpiece to the horizontal position so it is aligned generally within frame-image 14, reflecting selection of the correct paper tray. However, the workpiece is situated in a crooked position so the display screen 10 shows that edges of the workpiece 64*a*, 64*b* (shown with cross-hatching) would not be transferred onto the article 80 and the graphic matter 62*a–c* is tilted. This tilting of the workpiece may, for example, occur as the user closes the platen cover 56, which frequently has the impact of shifting a workpiece. Finally, in FIG. 2C, the display screen 10 shows the workpiece properly oriented within the frame-image 14, and the user at this point knows that upon activation of the image-acquisition apparatus, he or she will obtain the desired output.

Figure 2D:
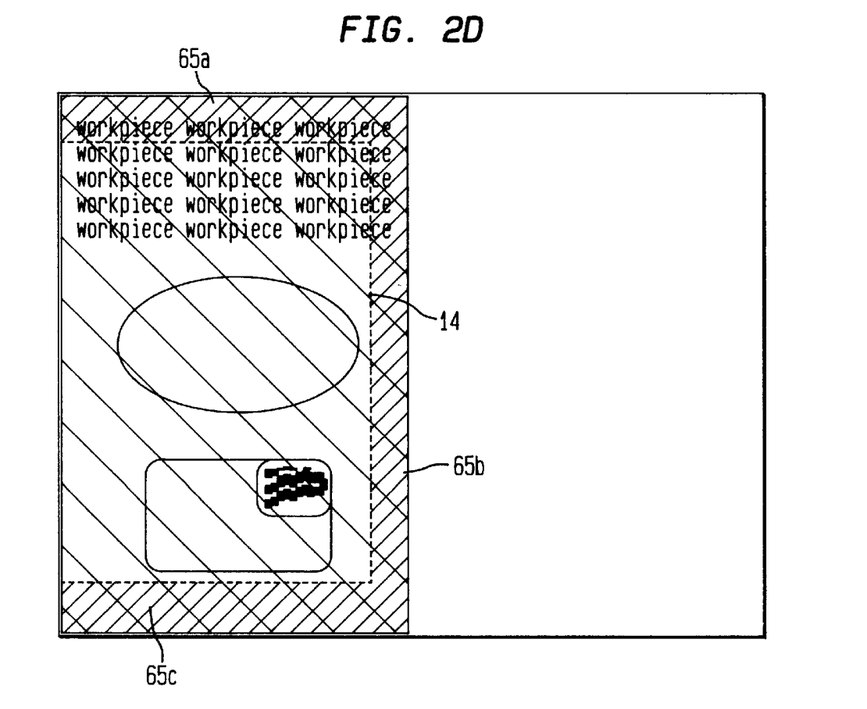
FIG. 2D reflects a workpiece oriented for selecting a reduced magnification function, the workpiece being left aligned and vertically centered.
Figure 2E:
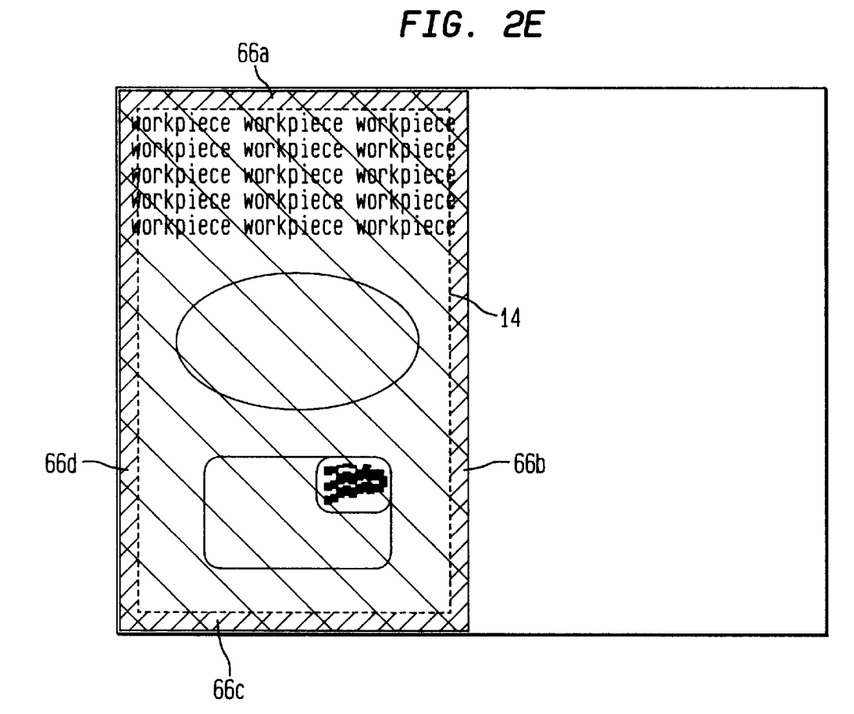
FIG. 2E reflects a workpiece oriented for selecting an edge erase function.

FIGS. 2D and 2E reflect situations where controls are selected for reduced magnification and edge erase functions, respectively. In FIGS. 2D and 2E, the platen-select area P is reduced as compared with the situation reflected by FIGS. 2A–2C, i.e., where the graphic matter is reproduced onto the article having basically the same dimensions as appearing on the workpiece. The frame-image 14 has, therefore, been reduced to correspond to the smaller platen-select area. Thus, in FIGS. 2D and 2E, the display screen 10 instructs the user that edge portions 65*a*, 65*b*, 65*c* (FIG. 2D), and edge portions 66*a*, 66*b*, 66*c*, and 66*d* (FIG. 2E) (shown with cross-hatching) will not be situated within the platen-select area and will not be copied to the article 80. Also, in FIG. 2D, the frame-image 14 instructs the user that the workpiece is left aligned and vertically-centered. If these parameters do not conform to the user's expectations, the user can adjust the demagnification or edge erase functions accordingly before operating the apparatus.

Figure 2F:
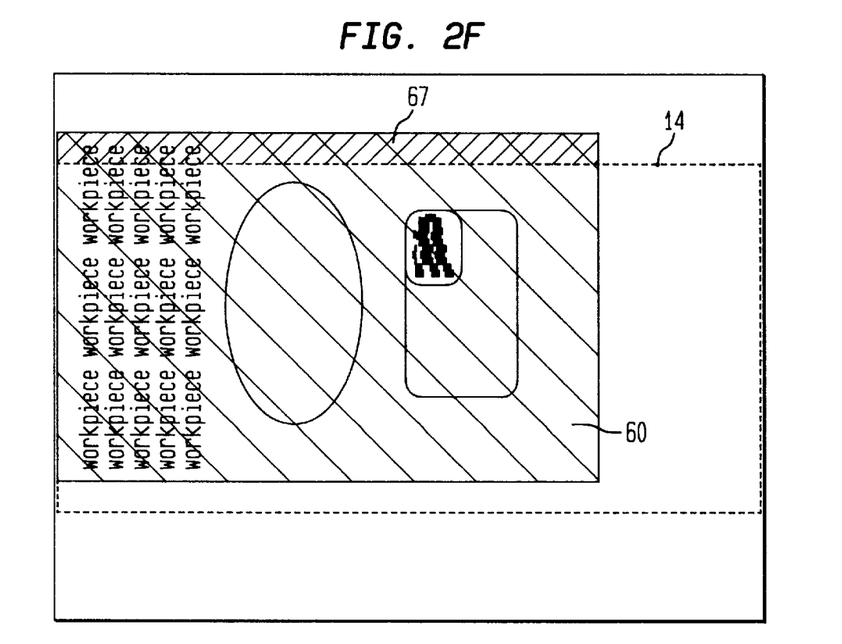
FIG. 2F reflects a letter-sized workpiece on the platen in a vertically-misaligned position when the paper tray is selected for legal-sized paper.

FIG. 2F provides an exemplary platen-image of the preview display screen where the user has selected a paper tray for legal-sized paper whereas a letter-sized workpiece is positioned on the platen. Also, FIG. 2F instructs the user that the workpiece is vertically misaligned so that edge portion 67 would not be transferred onto article 80 upon operating the apparatus. The user therefore knows that he or she should select a different paper tray and reposition the workpiece before operating the apparatus.

Figure 2G:
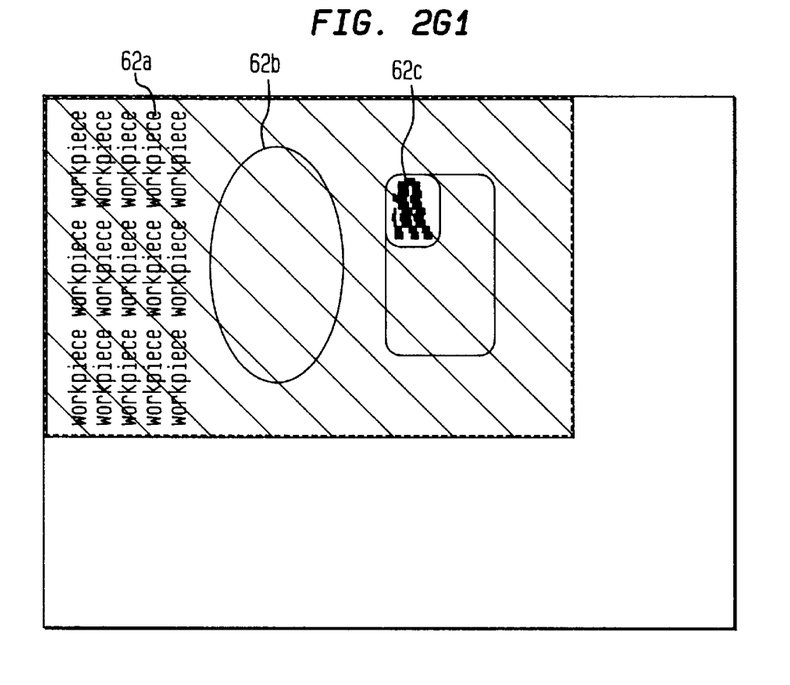
Figure 2G:
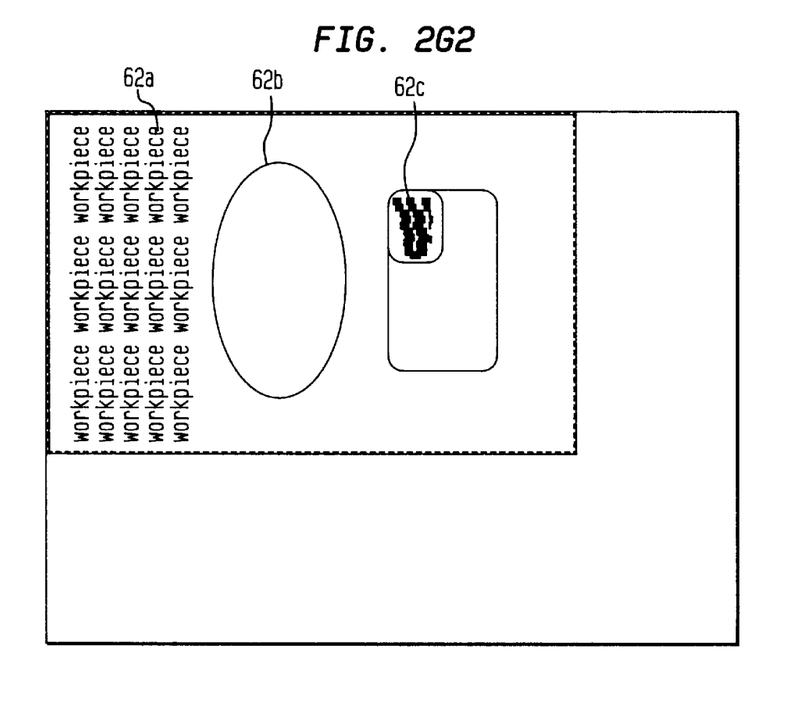

FIGS. 2G(1) and 2G(2) show exemplary images relating to selection of control options for contrast and brightness functions involving properly oriented workpieces. As can be seen particularly by comparing the exemplary images of the graphic matter 62*a*–62*c*, 2G(1) instructs the user that a high-contrast control feature has been selected, and 2G(2) instructs the user that a low-contrast control feature has been selected.

Figure 2H:
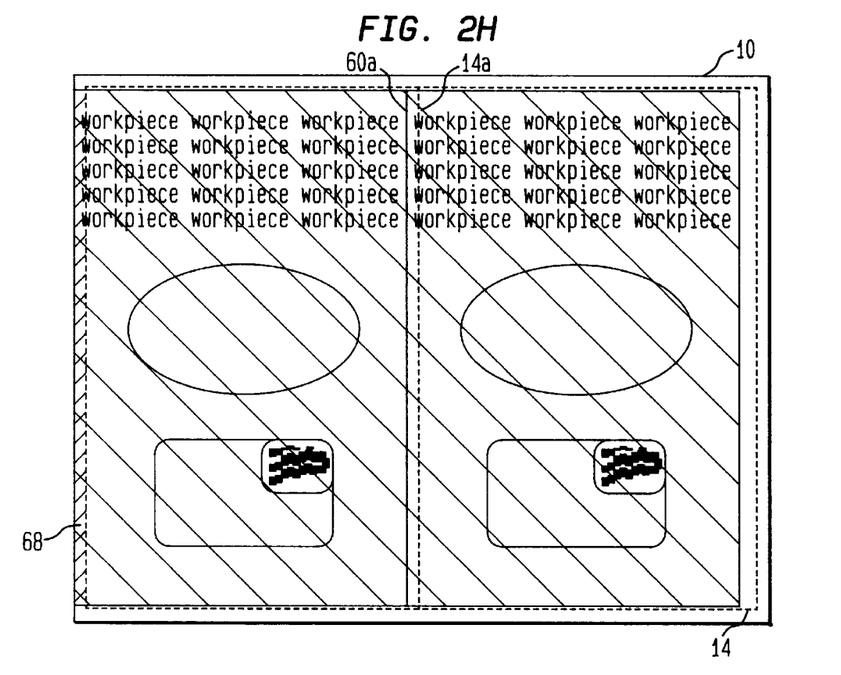
FIG. 2H reflects a book workpiece on the platen in a horizontally-misaligned position relative to the frame image.
Figure 2I:
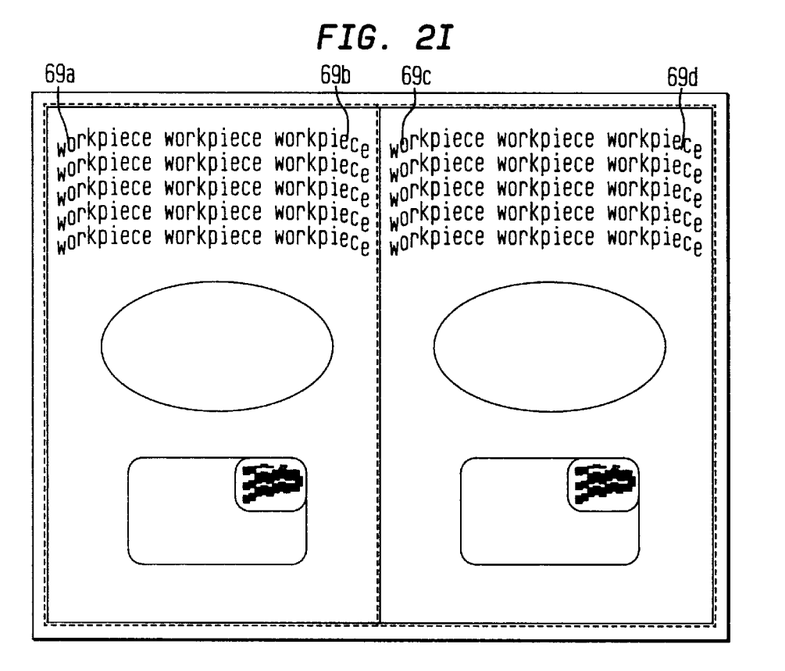
FIG. 2I reflects a book workpiece properly aligned on the platen but curved out of focus at the edges.

FIGS. 2H and 2I show exemplary images where the workpiece involves a book or journal and the frame-image 14 reflects a platen-select area corresponding to two pages of a book. In FIG. 2H, the preview display screen 10 instructs the user that the workpiece should be centered on the platen, as opposed to left-aligned, because the center 14*a* of the frame-image 14 is not aligned with the center 60*a* of the workpiece 60. The user therefore is instructed to adjust the book on the platen before activating the apparatus. FIG. 2I reflects a situation where a book is placed on the platen but not sufficiently flattened against the platen so that the edges and binding of the workpiece 69*a*, 69*b*, 69*c*, 69*d*, are not properly focused. Accordingly, the user is instructed to further flatten the workpiece before activating the apparatus.

Figure 3:
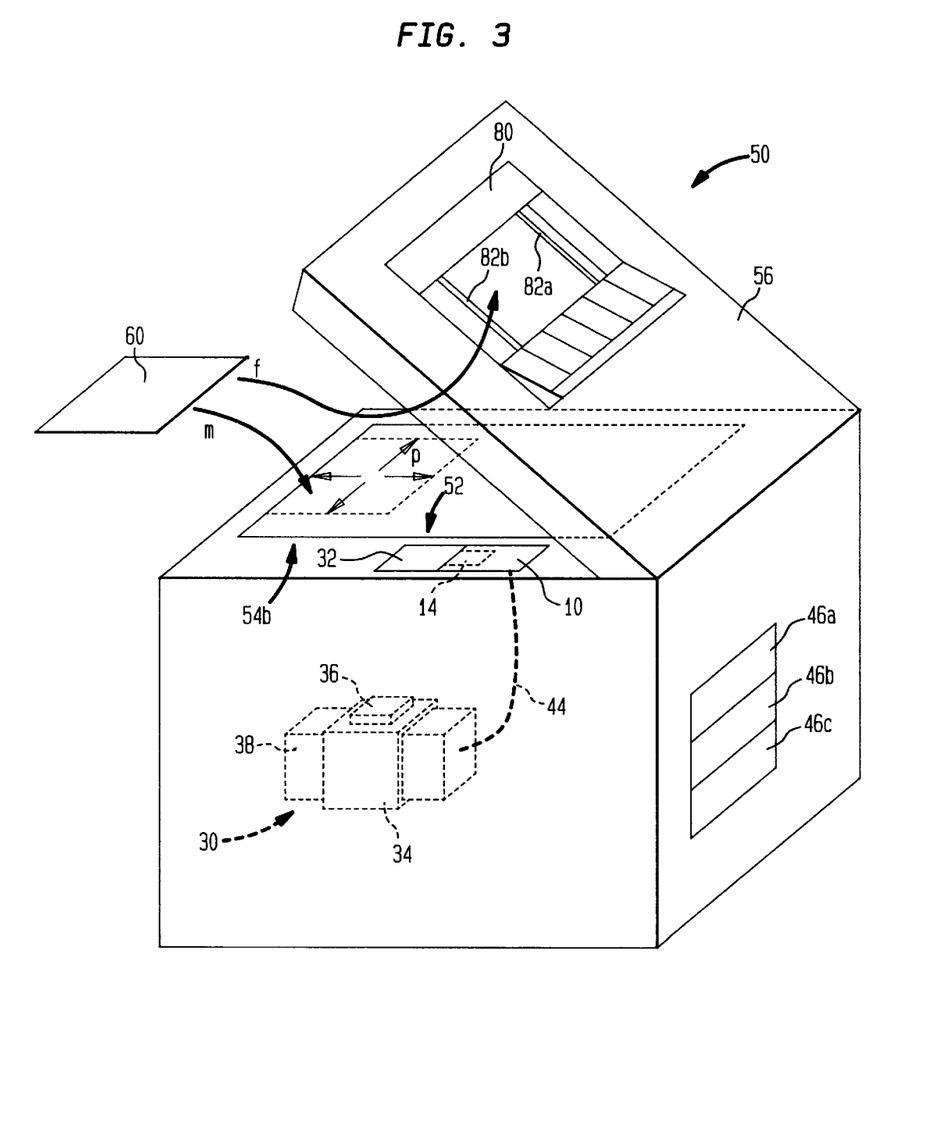
FIG. 3 illustrates one embodiment of the inventive apparatus comprising a photocopy machine having a preview display feature.

The platen-based image-acquisition apparatus with which the preview feature is used may, as discussed, comprise any apparatus where a workpiece must be properly positioned on a platen for transfer to another medium, including a photocopy machine, a scanner, or a facsimile machine. FIG. 3 illustrates one embodiment of the invention comprising a photocopy machine having a preview feature and a platen cover 56 with an automatic paper feeder 80. The invention pertains preferably to an image-acquisition apparatus where the user manually positions a workpiece upon a platen. However, the invention may be used with any image-acquisition apparatus having an automatic paper feeder (including a scanner or facsimile machine), as illustrated with FIG. 3.

FIG. 3 shows a perspective view of a photocopy machine 50, using character references corresponding to those used in FIGS. 1A–1B and showing hidden features with hatched lines. The apparatus comprises a transparent platen 52, for receiving therein a workpiece 60 having graphic matter (not shown) to be reproduced, with a platen cover 56 pivotally mounted on the machine for covering the platen 52. An image acquisition device (not shown) is disposed adjacent the inner surface of the platen 54*b*. A preview display screen 10 is visible to a user on the top surface of the machine. An image-processing system 30 comprising a camera 34, lens 36, and lightsource 38, is coupled to the preview display screen via connector 44 and disposed proximal the inner surface of the platen 54*b*. The image-processing system further comprises appropriate software, firmware, or hardware (not shown) for processing or manipulating images of the platen and transferring the images to the preview display screen 10.

The image-processing system images the entire platen region to define the platen-image, which includes a platen-select area P, the area on which the image-acquisition device will focus. The platen-image is formed upon the preview display screen, as well as a frame-image 14 for indicating the platen-select area so a user can determine before operating the apparatus whether the workpiece is positioned in the desired orientation, e.g., relative to the paper tray 46*a*, 46*b*, 46*c*, selected.

An automatic paper feeder 80 is provided within the platen cover 56, having moving sliders 82*a*, 82*b*, which aid the user in properly positioning the workpiece relative to the platen-select area. However, even if the workpiece is properly positioned by snugly fitting it within the moving sliders, difficulties may be encountered in selecting other settings, such as magnification, demagnification, edge erase, or the like, or the workpiece may not be properly oriented relative to the selected paper tray 46*a*–46*c*.

In any case, the inventive preview feature may be used with the automatic paper feeder 80. A user may, for example, manually place a representative part of the workpiece (i.e., the first page of a multi-page document) on the platen, i.e., following arrow m, to verify the proper selection of the settings before using the automatic paper feeder. Alternatively, the paper feeder may have two or more cycles for processing the workpiece, such that the workpiece need only be placed on the machine once, following arrow f. In this case, the feeder will in one cycle position the workpiece or a representative part thereof (e.g., the first page), against the platen for imaging on the preview display screen 10, and in a latter cycle, the image-acquisition device (not shown) may be activated to create the transferred image onto the article 80. The cycle involving activation of the image-acquisition device preferably is enabled manually by the user pressing a "start copying" button, but it also may be passively activated after a time delay. In an alternative embodiment, the area of the platen fed by the automatic paper feeder is imaged by a separate camera, lens, and lightsource (not shown) to predict the orientation and position of feeder-supplied pages on the platen relative to the machine parameters selected by the user.

Although FIG. 3 reflects a photocopy machine, it is to be understood that applying the same concepts the preview feature may be incorporated in a scanner coupled to a computer or a facsimile machine. With a scanner, a fixed camera with an appropriate lens and lightsource is preferably used to image the entire platen to quickly obtain a high-resolution image. The workpiece may be shown upon the platen relative to a frame reflecting the platen-select area or the fiducials indicating the cartesian coordinates of the scanning mechanism. Before the user closes the platen, the user can align the workpiece to the frame and fiducials, and then upon closing the platen, the user may see by viewing the display screen whether the workpiece shifts. The appropriate software and connectors may be bundled in with the scan-acquisition system (software or hardware) to allow a real-time video input to the computer and to control the lightsource so it is automatically disabled during operation of the scanner.

It is understood that the embodiments described herein are merely exemplary and that a person skilled in the art may make variations and modifications without departing from the spirit and scope of the invention. All such variations and modifications are intended to be included within the scope of the appended claims.

We claim:

1. An improved image-acquisition apparatus of the type having a transparent platen with an inner surface and outer surface, the outer surface being adapted for receiving thereon a workpiece having graphic matter, and an image-acquisition device disposed proximal the inner surface of the platen, distal the outer surface, having imaging optics for transferring to another medium an image displayed through a select area of the platen defining a platen-select area, wherein when the workpiece is positioned on the platen in a desired orientation, the graphic matter is disposed within the platen-select area so that upon operating the apparatus the graphic matter is transferred to the medium, the apparatus further having at least one control setting for adjusting the platen-select area, the improvement comprising:

a preview display screen visible to a user; and an image-processing system coupled to the preview display screen and disposed proximal the inner surface of the platen, wherein the image-processing system is a separable unit from the image-acquisition apparatus, is adapted for use with a one-dimensional image-acquisition device, and comprises an optical assembly having a camera and a lightsource for imaging a predetermined region of the platen encompassing the platen-select area to define a platen-image; and a means for forming upon the preview display screen a frame-image for indicating the platen-select area, the means for forming the frame image further being coupled to the image acquisition device and the at least one control setting so that the frame image is adjustable in response to changes in the at least one control setting, wherein the image-processing system forms the platen-image upon the preview display screen simultaneously as the frame image is formed on the preview display screen, the frame image being superimposed on the platen-image, so that a user can determine before operating the apparatus whether the image to be transferred to the medium conforms with the user's expectations.

2. The improved image-acquisition apparatus of claim 1, in which the image-processing system forms the platen-image in acquisition-and-read-out time characteristics and is coupled to a reset toggle.

3. The improved image-acquisition apparatus of claim 1, in which the one or more control settings comprise options for magnification, paper size, brightness, contrast, or edge reduction.

4. The improved image-acquisition apparatus of claim 1, in which the image-processing system comprises a two-dimensional parallel imaging device.

5. The improved image-acquisition apparatus of claim 1, further comprising a means for automatically deactivating the lightsource upon operating the apparatus.

6. The improved image-acquisition apparatus of claim 1, further comprising a platen cover pivotally mounted on the apparatus for moving from an open position to a closed position for blocking ambient light from the platen, wherein when the platen cover is in the closed position, the platen-image and frame-image are viewable by a user on the preview display screen.

7. The improved image-acquisition apparatus of claim 6, further comprising an automatic feeder for automatically positioning a workpiece having a plurality of pieces against the platen, the paper feeder having at least two cycles, wherein one of the cycles is adapted for positioning one or more pieces of the workpiece against the platen for imaging on the preview display screen and another one of the cycles is adapted for transferring the graphic matter to the medium.

8. The improved image-acquisition apparatus of claim 1, in which the apparatus comprises a photocopy machine.

9. The improved image-acquisition apparatus of claim 1, in which the apparatus comprises a scanner.

10. An improved photocopying apparatus of the type having a one-dimensional image acquisition device and a transparent platen with an inner surface and outer surface, the outer surface being adapted for receiving thereon a workpiece having graphic matter to be copied onto an article, wherein when the workpiece is positioned on the platen in a desired orientation, the graphic matter is disposed within an area of the platen defining a platen-select area so that upon operating the apparatus, the image-acquisition device copies the graphic matter contained within the platen-select area onto the article, the apparatus further being of the type comprising a platen cover pivotally mounted on the apparatus adjacent the outer surface for moving from an open position to a closed position for blocking ambient light from the platen and having at least one control setting for adjusting the platen-select area and the image transferred to the article, the improvement comprising:

a preview display screen visible to a user; and an image-processing system coupled to the preview display screen and disposed proximal the inner surface of the platen, wherein the image-processing system is a fixed separable unit from the image-acquisition apparatus, is adapted for use with a one-dimensional image acquisition device, and comprises an optical assembly having a camera and a lightsource for imaging a predetermined region of the platen to define a platen image, the platen image being sized to encompass the platen-select area; and a means for forming upon the preview display screen a frame-image for indicating the platen-select area, the means for forming the frame image further being coupled to the at least one control setting so that the frame image is adjustable in response to changes in the at least one control setting, wherein the image-processing system simultaneously forms the platen-image upon the preview display screen as the frame image is formed on the preview display screen, the frame image being superimposed on the platen image, the platen-image and frame-image being viewable by a user on the display screen when the platen cover is in a closed position so a user can determine before operating the apparatus whether the workpiece is positioned in the desired orientation, thereby enabling the user to manually perform rotational correction of the workpiece.

11. The improved photocopying apparatus of claim 10, in which the improvement further comprises a means for automatically activating the lightsource when the platen cover is moved from a closed position to an open position and a means for automatically deactivating the lightsource when the apparatus is activated for copying the graphic matter upon the article.

12. The improved image-acquisition apparatus of claim 10, in which the image-processing system forms the platen-image in acquisition-and-read-out time characteristics and the platen-image automatically dissipates from the preview display screen after a prescribed period of time.

13. The improved image-acquisition apparatus of claim 10, in which the image-processing system forms the platen-image in acquisition-and-read-out time characteristics and is coupled to a reset toggle so that the user may manually clear the preview display screen or reset the preview display screen to reflect the platen-image.

14. The improved image-acquisition apparatus of claim 1, in which the image-acquisition device is movable with changes in the at least one control setting and the image-processing system is fixed.

* * * * *